(12) United States Patent
Hünlich

(10) Patent No.: US 6,584,107 B1
(45) Date of Patent: Jun. 24, 2003

(54) METHOD FOR REALIZING EMULATED RING NETWORK STRUCTURES IN A COMMUNICATION NETWORK THAT IS DESIGNED ACCORDING TO ASYNCHRONOUS TRANSFER MODE

(75) Inventor: Klaus Hünlich, Neuching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/341,586

(22) PCT Filed: Jan. 9, 1998

(86) PCT No.: PCT/DE98/00070

§ 371 (c)(1),
(2), (4) Date: Jul. 14, 1999

(87) PCT Pub. No.: WO98/33353

PCT Pub. Date: Jul. 30, 1998

(30) Foreign Application Priority Data

Jan. 22, 1997 (DE) .......................... 197 02 107

(51) Int. Cl.[7] .............................................. H04Q 11/04
(52) U.S. Cl. ................................................. 370/395.53
(58) Field of Search ................................. 370/351, 355, 370/357, 395.1, 397, 398, 399, 395.3, 395.31, 395.53, 395.54, 400, 403, 404, 406, 409

(56) References Cited

U.S. PATENT DOCUMENTS

| | | | | |
|---|---|---|---|---|
| 4,901,312 A | * | 2/1990 | Hui et al. ............... | 370/403 |
| 5,715,250 A | * | 2/1998 | Watanabe .............. | 370/395.53 |
| 5,878,043 A | * | 3/1999 | Casey ................... | 370/397 |
| 6,252,870 B1 | * | 6/2001 | Fraas et al. ............ | 370/353 |
| 6,256,292 B1 | * | 7/2001 | Ellis et al. ............. | 370/227 |
| 6,285,674 B1 | * | 9/2001 | Soni et al. ............. | 370/390 |
| 6,337,863 B1 | * | 1/2002 | Nair et al. ............. | 370/395.53 |

FOREIGN PATENT DOCUMENTS

| | | |
|---|---|---|
| EP | 0 468 813 A1 | 1/1992 |
| GB | 2 302 234 | 1/1997 |
| WO | WO 97/43844 | 11/1997 |

OTHER PUBLICATIONS

Cherbonnier et al. "ATM Direct Connectionless Service" IEEE 1993. IBM Research Division. pp. 1859–1863.*
Taylor, M., LAN Emulation over ATM[1], vol. 20, No. 1, (1997), Elsevier, Computer Communications, pp. 48–59.
Hong Linh Truong et al, LAN Emulation on an ATM Network, IEEE Communications Magazine, (1995), pp. 70–85.
Anthony Alles, ATM Internetworking White Paper, (1995) pp. 25–33.
Martinson, T. et al. "Optische Gigabit–ATM–Netztechnologie Intensiviert den Sprachunnterricht an der Universität", Tec. Das Technische Magazin von ASCOM, No. 2, 1995, pp. 26–31.

* cited by examiner

Primary Examiner—Melvin Marcelo
Assistant Examiner—Derrick W Ferris
(74) Attorney, Agent, or Firm—Staas & Halsey

(57) ABSTRACT

ATM communication terminal devices (KE1 . . . 4) of a communication network that is designed according to ATM can be inventively allocated to a ring network structure, whereby a ring network address (EA,GA) is respectively assigned to these ATM communication terminal devices (KE1 . . . 4), and the ring network access and the ring network communication are controlled in a ring-network-specific manner. On the basis of the imaging, into the virtual channel identification (VCI) of ATM cells, of a ring network address (EA,GA) identifying one or more ATM communication terminal devices (KE1 . . . 4), an emulated ring network structure (LAN emulation) is realized easily.

9 Claims, 2 Drawing Sheets

METHOD FOR REALIZING EMULATED RING NETWORK STRUCTURES IN A COMMUNICATION NETWORK THAT IS DESIGNED ACCORDING TO ASYNCHRONOUS TRANSFER MODE

BACKGROUND OF THE INVENTION

In an ATM communication network which is designed according to asynchronous transfer mode, ATM communication terminal equipment is connected to at least partially meshed ATM switching units. The physical connections between ATM switching units and between these and the ATM communication terminal equipment are divided into virtual paths and virtual channels. In a connection setup, prior to the start of the transmission of useful data, connection tables with routing information that consists of virtual channel identifiers (referenced VCI hereinafter) and virtual path identifiers (referenced VPI hereinafter) are created in the respective ATM switching units by means of an exchanging of signalling information. It is indicated by the VCI and VPI inserted into the connection tables how the virtual paths, or respectively, the virtual transmission channels which are contained in the virtual paths, of the incoming and outgoing virtual connections of the ATM switching unit are allocated to one another by the signalling. An item of routing information consisting of a VPI and a VCI is inserted in a head field in ATM cells which transport useful data and which are switched via these connections. In an ATM switching unit, the head fields of the incoming ATM cells are processed; i.e., the routing information contained there is analyzed. The ATM cells are subsequently switched to a destination, which is determined by the analyzed routing information, through the coupling network which is arranged in the ATM switching unit and which consists of one or more coupling elements.

Communication networks can also be designed as local networks (LAN). A particularly advantageous communication network for connectionless communication services is a ring network. Ring networks are usually realized according to the IEEE Standard 802.5. According to this standard, information is transmitted in the ring network serially from station to station, or respectively, from communication terminal equipment to communication terminal equipment. According to this standard, a station transmits to the ring the information to be transmitted, which information circulates in said ring from one station to the next. The relevant information is copied by the destination station that is identified by the destination address, and said information is simultaneously forwarded to the next station. When a transmitting station receives the data it originally transmitted, these are removed from the transmission medium. Ring network addresses are provided for the switching of information. According to the IEEE Standard 802.5, in a targeted transmission to one station in a destination address field, a ring network individual address is inserted, and in a targeted transmission to a predeterminable group of stations, a ring network group address is inserted. Furthermore, a token—a specific bit sequence—circulates in the ring network, with the aid of which token access to the ring network resources is controlled. The token is transmitted subsequent to a successfully completed information transfer and circulates via the transmission medium, i.e. is delivered from one station to the subsequent station. Stations can obtain access to the transmission medium in that they remove the circulating token. Upon the end of the data transfer, the transmitting station generates a new token so that other stations can obtain access to the transmission medium.

Furthermore, ATM communication networks in which local networks (LAN's) are integrated are currently being designed. For example, Great Britain reference, GB 2 302 234 A teaches an ATM communication network, which is designed according to autonomous transfer mode, in which a plurality of ATM communication terminal devices can be allocated to an ATM ring network structure.

In the reference "ATM Internetworking, White Paper, May 1995" (Anthony Alles, pp. 25–33), two methods are described for controlling a ring network access and the ring network communication according to a ring network protocol within an ATM communication network. According to a first method, also known as "native mode operation", the ring network addresses, or respectively, ring network group addresses are converted directly into ATM destination addresses by an "address resolution mechanism", and the information is transmitted via the ATM communication network. LAN emulation is cited as another method for the realization of ring network protocols in an ATM communication network. The task of an LAN emulation protocol is to emulate a local network superimposed on an ATM communication network. The emulation of an ethernet or token ring network structure takes place in centrally arranged specific units such as an LAN emulation client, an LAN emulation server, a broadcast and unknown server, or an LAN emulation configuration server. Communication requests by communication terminal equipment which is allocated to the local network LAN are switched via the ATM communication network to these central means, from which the LAN-specific handling of the communication connections is performed.

The invention is based on the object of realizing, with the lowest additional outlay, an emulated ring network structure in an ATM communication network which is designed according to asynchronous transfer mode.

In the inventive method for realizing emulated ring network structures in a communication network that is designed according to asynchronous transfer mode, a plurality of ATM communication terminal devices are connected to an ATM switching unit that is designed according to ATM. ATM cells comprising a cell head which are transferred from the ATM communication terminal devices to the ATM switching unit are switched to an ATM destination communication terminal device with the aid of routing information which respectively consists of a virtual path identifier VPI and a virtual channel identifier VCI. The ATM communication terminal devices can be allocated to a ring network structure, whereby a ring network address is assigned to these ATM communication terminal devices, respectively, and the ring network access and the ring network communication is controlled in a ring-network-specific manner. The essential aspect of the inventive method is that a virtual path is respectively set up in every transmission direction between the allocated ATM communication terminal devices and the ATM switching unit as a virtual path. In a ring network structure communication, a virtual ring network channel identifier which represents a ring network address is assigned to the virtual ring network path identifier representing the respective virtual ring network path. The ATM cells that are transmitted via the virtual ring network structure are respectively switched to the ATM communication terminal devices that are addressed by the ring network address.

An essential advantage of the inventive method is that an emulated ring network structure (LAN emulation) is realized particularly simply by setting up a virtual ring network path in a communication network that is designed according to autonomous transfer mode ATM and by imaging a ring network address identifying one or more ATM communication terminal devices into the virtual channel identification of ATM cells.

In a ring network structure that is led via a plurality of at least partially meshed ATM switching units, a virtual path which is directed according to the transmission direction of the ring structure is set up as a virtual ring network path between the relevant ATM switching units, whereby virtual ring network paths are represented by virtual ring network path identifiers. In a ring network structure communication between the ATM switching units, the ATM cells are switched to the respective established ring network paths with the aid of virtual ring network path identifiers and are transmitted via these. An emulated ring network structure, or respectively, an LAN emulation is thus advantageously realized, without additional central means (e.g. LAN server, LAN router), in an ATM communication network which comprises a plurality of ATM switching units and a plurality of ATM communication terminal devices.

The ring network address represents either a ring network individual address or a ring network group address.

According to another advantageous development, a first predetermined ring network group address represents a broadcast address and a second predetermined ring network group address represents a ring network token, whereby the ring network token controls the access to the ring network structure.

With respect to its size and to the identifier of the ring network individual address and ring network group address, the ring network address is advantageously formed according to the IEEE Specification 802.5. The ring network token is represented by a predeterminable ring network group address. Due to the standardized addressing, network applications, or respectively, network drivers that are already realized can be transferred onto the emulated ring network structure without a great outlay for adaptation.

According to another advantageous development, the ATM cells which are transmitted to an ATM switching unit and which comprise a ring network group address are switched, by means of a ring table, to the ATM communication terminal devices which are connected to the ATM switching unit and which are allocated to the ring network structure. Due to the setup of a ring table in each ATM switching unit that is allocated to the emulated ring network structure, the emulated ring network structure, or respectively, the virtual ring network path is realized with extremely little additional outlay.

Given a currently specified ring network individual address, this is converted into an ATM communication network address and switched directly to the relevant ATM communication terminal device according to the converted ATM communication network address. ATM cells comprising a ring network individual address are not switched to all the ATM communication terminal devices which are allocated to the emulated ring network structures, but are switched directly to the ATM communication terminal device represented by the ring network individual address. In the data transmission with a ring network individual address, greater security is achieved in the data transmission, since the information, or respectively, ATM cells to be transmitted are switched directly, i.e. in a connection-oriented manner and not in a connectionless manner, i.e. via every ATM communication terminal device that is connected to the emulated ring network structure.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
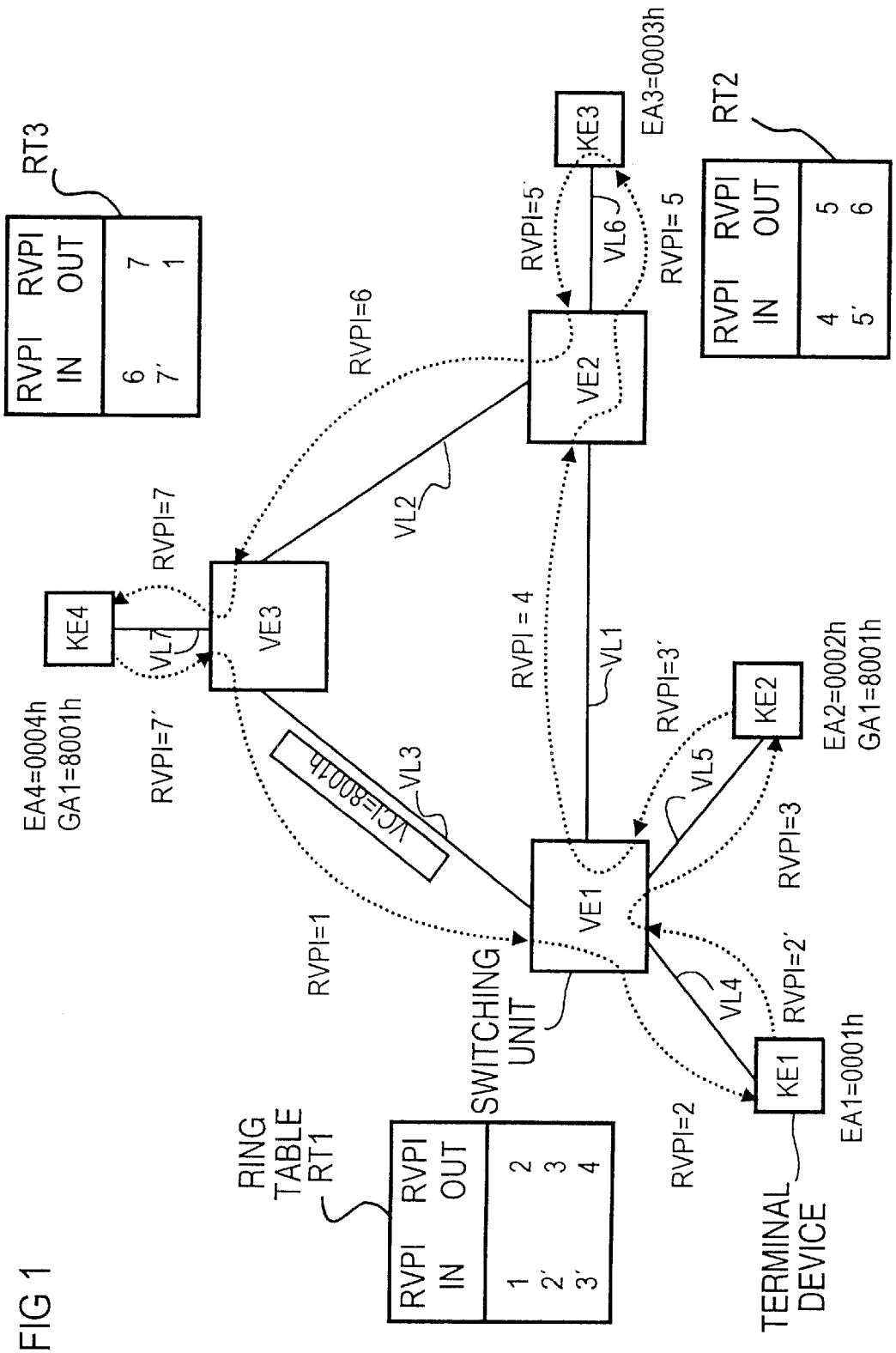
FIG. 1 depicts a block circuit diagram with a plurality of at least partially meshed ATM switching units which are connected to a plurality of ATM communication terminal devices which are allocated to a ring network structure.

FIG. 1 depicts three ATM switching units VE1 . . . 3 which are arranged in a communication network (not illustrated) that is designed according to asynchronous transfer mode ATM, and which are meshed via three ATM connecting lines VL1 . . . 3. This first ATM switching unit VE1 is connected to the second ATM switching unit VE2 via a first ATM connecting line VL1, which second switching unit is in turn connected to the third ATM switching unit VE3 via a second ATM connecting line VL2. The third ATM switching unit VE3 is connected to the first ATM switching unit VE1 via the third ATM connecting line VL3. Furthermore, via an additional ATM connecting line VL4 . . . 7, respectively, a first and a second ATM communication terminal device KE1,2 are connected to the first ATM switching unit VE1; a third ATM communication terminal device KE3 is connected to the second ATM switching unit VE2; and a fourth ATM communication terminal device KE4 is connected to the third ATM switching unit VE3. Said ATM communication terminal devices KE1 . . . 4 are allocated to a unidirectional ring network structure (see dotted line). The ATM communication terminal devices KE1 . . . 4 respectively comprise a ring-network-structure-specific ring network individual address EA1 . . . 4, which are formatted according to the 16-bit destination addressing described in the IEEE Standard 802.5. In the exemplifying embodiment, the hexadecimal ring network individual address EA1=0001h is assigned to the first ATM communication terminal device KE1; the hexadecimal ring network individual address EA2=0002h is assigned to the second ATM communication terminal device KE2; the hexadecimal ring network individual address EA3=0003h is assigned to the third ATM communication terminal device KE3; and the hexadecimal ring network individual address EA4=0004h is assigned to the fourth ATM communication terminal device KE4. Furthermore, the second ATM communication terminal device KE2 and the fourth ATM communication terminal device KE4 form an ATM communication terminal device group that can be identified by means of a ring network group address GA1. According to the cited IEEE Standard 802.5, the most significant bit MSB in a bit sequence that represents the ring network group address GA1 is set; in FIG. 1 the bit sequence representing the hexadecimal value 8001h represents the ring network group address GA1, which, besides the ring network individual address EA2,4, is additionally allocated to the second and fourth ATM communication terminal devices KE2,4. The access to the transmission medium—e.g. light waveguides or coaxial cable—by said ATM communication terminals is controlled according the token ring access protocol described in the IEEE Standard 802.5. The switching of ATM cells that are transferred to the ATM switching units VE1 . . . 4 occurs with the aid of connection tables (not illustrated) that are arranged in the ATM switching units VE1 . . . 4 and that comprise information about virtual connections.

In order to realize the inventive emulation of a ring network structure between the four ATM communication terminal devices KE1 . . . 4 and the three ATM switching units VE1 . . . 3 based on the ATM switching technique, an additional ring table RT1 . . . 3 is provided in each ATM switching unit VE1 . . . 3. In the three ring tables RT1 . . . 3, information—virtual ring network path identifiers—is entered by virtual paths that enter and exit at an ATM switching unit VE1 . . . 3, respectively, whereby the virtual paths which are specified in the ring tables RT1 . . . 3, or respectively, their identification values RVPI form a unidirectional virtual ring network path (see dotted lines) that connects said ATM communication terminal devices KE1 . . . 4. The values of the virtual channel identification RVCI of the ATM cells that are transmitted within the virtual ring network path inventively represent a ring network individual address EA, or respectively, a ring network group address GA.

Figure 2:
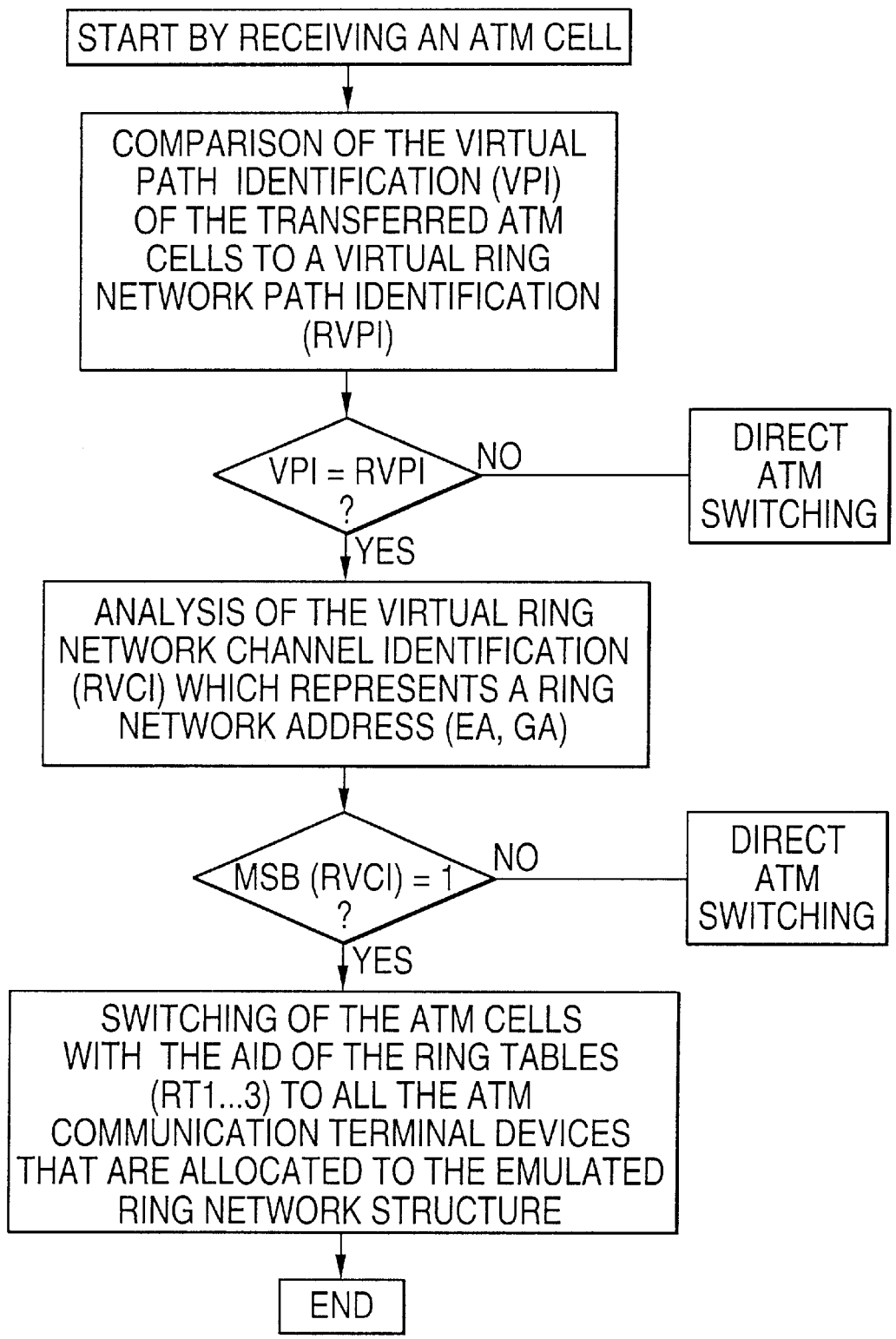
FIG. 2 is a switching flow diagram which is respectively realized in the ATM switching units and which illustrates the inventive ATM switching process.

The switching of ATM cells that are transferred to an ATM switching unit VE1 . . . 3 occurs with the aid of the switching flow diagram illustrated in FIG. 2:

If the virtual path identification VPI which is arranged in the routing information of the incoming ATM cells does not correspond to any of the virtual ring network path identifications RVPI which are specified in the ring tables RT1 . . . 3 and which are assigned to a ring network structure, or respectively, a ring network path, then the corresponding ATM cells are switched directly with the aid of the routing information and the created connection tables. If the virtual path identification VPI of the incoming ATM cell does correspond to a virtual ring network path identification RVPI that represents a virtual ring network path, then the virtual ring network channel identification RVCI that represents a ring network address for the ring network switching is additionally evaluated. The virtual ring network channel identification RVCI of ATM cells comprising a virtual ring network path identification RVPI inventively represents either a ring network individual address EA or a ring network group address GA. Given a set most significant bit MSB, the virtual ring network channel identification RVCI represents a ring network group address GA; if the most significant bit MSB is not set, the virtual ring channel identification RVCI represents a ring network individual address EA, whereby, according to the switching flow diagram illustrated in FIG. 2, ATM cells comprising a ring network individual address EA are transferred directly, in accordance with ATM switching. Due to the direct switching of ATM cells comprising a ring network individual address EA to the destination defined by the virtual ring network channel identification RVCI, long data transport transit times are avoided.

According to FIG. 2, ATM cells to be switched to a group address GA (i.e., the most significant bit MSB of the virtual channel identification RVCI is set) are switched, according to the ring tables that are arranged in the ATM switching units VE1 . . . 3, to all ATM communication terminal devices KE1 . . . 4 that are allocated to the virtual ring network path in succession. In FIG. 1, ATM cells—one of which is illustrated as representative of all ATM cells which form the data current—with the virtual path identification VPI=1 and the virtual channel identification VCI=8001h are transmitted from the third ATM switching unit VE3 to the first ATM switching unit VE1 via the third ATM connecting line VL3. With the aid of the ring table RT1 which is arranged in the first ATM switching unit VE1, the inclusion of the ATM cells comprising the virtual path identification VPI=1 in the virtual ring network path with the ring network path identification RVPI=1 is established. The allocated virtual ring network channel identification RVCI=8001h inventively represents the assigned ring network address. Since the most significant bit MSB of the virtual ring network channel identification RVCI is set—MSB(RSVCI=8001h)=1—this represents the ring network group address GA1, which identifies the second and fourth ATM communication terminal devices KE2,4. According to the first ring table RT1, the ATM cells arriving via the virtual ring network path with the virtual ring network path identification VPI=RVPI=1 are transmitted to the first ATM communication terminal device KE1 via the virtual ring network path that comprises the virtual ring network path identification RVPI=2. This communication terminal device checks the relevance of the received ATM cells by evaluating the virtual ring network channel identification RVCI; i.e., the virtual ring network channel identification RVCI of the received ATM cells is compared to the ring network individual address EA which is assigned to the first ATM communication terminal device KE1, or respectively, to the ring network group address GA if it exists. The ATM cells are subsequently sent back to the first ATM switching unit via the virtual ring network path with the virtual ring network path identification RVPI=2. From there, the ATM cells are transmitted to the second ATM communication terminal device KE2, according to the ring table RT1, via the virtual ring network path with the virtual ring network path identification VPI=3. Since the virtual ring network channel identification RVCI of the ATM cells is identical to the ring network group address GA1 that is assigned to the second ATM communication terminal device KE2 (RVCI=GA1), the useful information contained in the ATM cells is copied and stored in the second ATM communication terminal device.

The ATM cells are subsequently transmitted to the first ATM switching unit VE1 via the virtual ring network path with the virtual ring network path identification RCPI=3'. According to the first ring table RT1, the ATM cells are transmitted to the second ATM switching unit VE2 via the virtual ring network path comprising the virtual ring network path identification RVPI=4. The switching, via the virtual ring network paths with the virtual ring network path identifications RVPI5,5',6,7,7', of the ATM cells to the ATM communication terminal devices KE3,4, which are connected to the second and third ATM switching unit, and the evaluation of the corresponding virtual ring network channel identification RVCI in the ATM communication terminal devices KE3,4 occurs in the manner described above. When ATM cells arrive at that ATM communication terminal device KE1 . . . 4 which originally transmitted the ATM cells, then the relevant ATM cells are removed by the ATM communication terminal device KE1 . . . 4.

Due to the design of the ring tables RT1 . . . 3 arranged in the ATM switching units VE1 . . . 3, the ATM cells that comprise a ring network group address GA as virtual ring network channel identification RVCI, and ATM cells which are allocated to the inventive emulated ring network structure, or respectively, to the ring network path, are switched to all ATM communication terminal devices KE1 . . . 4 that are allocated to the ring network path serially, or respectively, in succession. A circulation of the information, or respectively, ATM cells which are transported via the emulated ring network structure is thus achieved in accordance with the token ring access protocol described in the IEEE Standard 802.5. In addition, a circulation of the ring network token to all the ATM communication terminal devices KE1 ... 4 that are allocated to the emulated ring network structure is achieved by the inventive realization of the ring network token as a predetermined ring network group address, by the hexadecimal value 8000h, for example. An ATM communication terminal device KE1 ... 4 can then access the emulated ring network structure, or respectively, its resources the moment this device receives the token bit sequence representing the ring network token. This ATM communication terminal device KE1 ... 4 can then transmit one or more data packets via the emulated ring network structure.

By the imaging of the ring network address representing a ring network individual address EA, or respectively, a ring network group address GA or a ring network token onto the ATM-specific virtual channel identification VCI, or respectively, the virtual ring network channel identification RVCI in the head field of ATM cells to be transmitted, an emulated ring network structure is realized with extremely little additional outlay in a communication network that is designed according to asynchronous transfer mode ATM. Additional means such as LAN servers or group servers are not necessary for the inventive method, which makes it possible to keep the economic and network-management outlay low. Application programs, or respectively, network drivers which are already programmed for local network applications can be transferred to the emulated ring network structure, or respectively, to the ATM switching technology realized within the ring network structure without great outlay. The traffic flow, or respectively, the network performance of an already existing local network LAN can thus be increased without great outlay by the conversion of the transmission medium to ATM switching technology.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for realizing emulated ring network structures in a communication network, operating according to asynchronous transfer mode (ATM), with a plurality of ATM communication terminal devices connected to an ATM switching unit that operates according to ATM to transmit ATM cells, each containing a cell header, to the ATM switching unit from the ATM communication terminal devices and which are then switched to an ATM destination communication terminal device using routing information contained in the cell header and formed of a virtual path identifier and a virtual channel identifier, said method comprising:

allocating ATM communication terminal devices to a ring network structure, a standardized ring network address being respectively assigned to the allocated ATM communication terminal devices;

setting up a virtual path conforming to ATM and representing a component of the ring network structure, as a virtual ring network path between the allocated ATM communication terminal devices and the ATM switching unit in every transmission direction, each virtual ring network path being represented by a virtual ring network path identifier;

assigning in a ring network structure communication a virtual ring network channel identifier, representing the standardized ring network address of one of the allocated ATM communication terminal devices, to the virtual ring network path identifier representing the virtual ring network path; and respectively switching ATM cells, transmitted via the virtual ring network path, to the one of the allocated ATM communication terminal devices addressed by the virtual ring network channel identifier assigned to the virtual channel identifier in the cell header of the ATM cells.

2. The method according to claim 1, wherein in a ring structure which is led via a plurality of at least partially meshed ATM switching units, a virtual path which is directed according to a transmission direction of the ring structure is set up between the relevant ATM switching units as a virtual ring network path, whereby virtual ring network paths are represented by virtual ring network path identifiers, and wherein in a ring network structure communication between the ATM switching units, the ATM cells are switched to respective established ring network paths using virtual ring network path identifiers and are transmitted via these paths.

3. The method according to claim 1, wherein a plurality of virtual ring network paths are set up in a respective transmitting direction.

4. The method according to claim 1, wherein the ATM communication terminal devices is allocatable to a plurality of ring network structures.

5. The method according to claim 1, wherein the ring network address represents one of a ring network individual address or a ring network group address.

6. The method according to claim 5, wherein a first defined ring network group address represents a broadcast address, and a second defined ring network group address represents a ring network token, whereby the ring network token controls access to the ring network structure.

7. The method according to claim 5, wherein with respect to size and to identification of the ring network individual address and of the ring network group address, the ring network address is formed according to a IEEE Specification 802.5 standard, and wherein the specified ring network token is represented by a definable ring network group address.

8. The method according to claim 5, wherein given ATM cells which are transmitted to an ATM switching unit and which has a ring network group address, said ATM cells are switched, by a ring table, to the ATM communication terminal devices which are connected to the ATM switching unit and which are allocated to the ring network structure.

9. The method according to claim 5, wherein given a currently specified ring network individual address, the currently specified ring network is converted into an ATM communication network address and is switched directly to a relevant ATM communication terminal device according to the converted ATM communication network address.

* * * * *